United States Patent
Einstein et al.

(10) Patent No.: US 12,091,018 B2
(45) Date of Patent: Sep. 17, 2024

(54) SYSTEMS AND METHODS FOR ROAD TYPE DETERMINATION

(71) Applicant: Toyota Motor Engineering & Manufacturing North America, Inc., Plano, TX (US)

(72) Inventors: Noah Mitchell Einstein, Ann Arbor, MI (US); Vladimeros Vladimerou, Whitmore Lake, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 312 days.

(21) Appl. No.: 17/592,633

(22) Filed: Feb. 4, 2022

(65) Prior Publication Data
US 2023/0249690 A1 Aug. 10, 2023

(51) Int. Cl.
*B60W 40/072* (2012.01)
*B60W 40/04* (2006.01)
(Continued)

(52) U.S. Cl.
CPC .......... *B60W 40/072* (2013.01); *B60W 40/04* (2013.01); *B60W 40/105* (2013.01);
(Continued)

(58) Field of Classification Search
CPC .. B60W 40/072; B60W 40/04; B60W 40/114; B60W 40/105; B60W 2050/0002;
(Continued)

(56) References Cited

U.S. PATENT DOCUMENTS

| | | |
|---|---|---|
| 7,522,091 B2 | 4/2009 | Cong et al. |
| 10,202,144 B2 | 2/2019 | Brown et al. |
| (Continued) | | |

FOREIGN PATENT DOCUMENTS

JP 2001349734 A * 12/2001

OTHER PUBLICATIONS

English translation of Japanese foreign publication 2001349734 (Year: 2001).*

*Primary Examiner* — Russell Frejd
*Assistant Examiner* — Brandon Z Willis
(74) *Attorney, Agent, or Firm* — Christopher G. Darrow; Darrow Mustafa PC

(57) ABSTRACT

A system for determining a type of a road upon which a vehicle is traveling includes a processor and a memory in communication with the processor. The memory has a road type determination module having has instructions that cause the processor to determine, using sensor data having information about at least one of a vehicle and a road upon which the vehicle is traveling, that the vehicle previously traveled on a ramp leading to a limited access highway. The road type determination module also has instructions that cause the processor to determine, using the sensor data, that the road is a limited access highway when the vehicle is traveling at or below a first predetermined speed for a first predetermined amount of time sufficiently immediately after determining that the vehicle was traveling on a ramp, and the vehicle is behind one or more preceding slow-moving vehicles.

17 Claims, 10 Drawing Sheets

(51) Int. Cl.
*B60W 40/105* (2012.01)
*B60W 60/00* (2020.01)
*G06V 20/56* (2022.01)
*G06V 20/58* (2022.01)

(52) U.S. Cl.
CPC ....... *B60W 60/0051* (2020.02); *G06V 20/582* (2022.01); *G06V 20/584* (2022.01); *G06V 20/588* (2022.01); *B60W 2520/14* (2013.01); *B60W 2540/18* (2013.01); *B60W 2552/05* (2020.02); *B60W 2552/30* (2020.02); *B60W 2552/53* (2020.02); *B60W 2554/4026* (2020.02); *B60W 2554/4029* (2020.02); *B60W 2554/80* (2020.02); *B60W 2555/60* (2020.02); *B60W 2556/10* (2020.02); *B60W 2556/40* (2020.02)

(58) Field of Classification Search
CPC ......... B60W 30/18145; B60W 50/082; B60W 60/0051; B60W 2420/40; B60W 2420/403; B60W 2420/408; B60W 2520/14; B60W 2520/10; B60W 2540/18; B60W 2555/60; B60W 2552/05; B60W 2552/10; B60W 2552/30; B60W 2552/45; B60W 2552/53; B60W 2552/20; B60W 2554/20; B60W 2554/4026; B60W 2554/4029; B60W 2554/406; B60W 2554/408; B60W 2554/80–2554/806; B60W 2556/10; B60W 2556/40; B60W 2556/50; G06V 20/56; G06V 20/58; G06V 20/588; G06V 20/582; G06V 20/584; G06T 2207/30236; G06T 2207/30252; G06T 2207/30256; G06T 2207/30261; G08G 1/0133; G08G 1/0104; G08G 1/01

See application file for complete search history.

(56) References Cited

U.S. PATENT DOCUMENTS

| | | | |
|---|---|---|---|
| 10,319,225 B2 | 6/2019 | Lindholm et al. | |
| 10,922,969 B2 * | 2/2021 | Song | G08G 1/207 |
| 11,127,287 B2 | 9/2021 | Lindholm et al. | |
| 2021/0010815 A1 * | 1/2021 | Kawabata | G01C 21/3691 |
| 2021/0370936 A1 * | 12/2021 | Bhatnagar | B60W 30/16 |
| 2022/0119016 A1 * | 4/2022 | Rajvanshi | B60W 60/0059 |
| 2022/0135039 A1 * | 5/2022 | Jardine | B60W 30/18159 |
| | | | 701/26 |

* cited by examiner

SYSTEMS AND METHODS FOR ROAD TYPE DETERMINATION

TECHNICAL FIELD

The subject matter described herein relates, in general, to systems and methods for determining a road type and, more specifically, to determining a type of a road upon which a vehicle is traveling.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Vehicles with full or partial autonomous capability include various sensors that gather a significant amount of information about the vehicle and the environment surrounding the vehicle. The information gathered by the sensors can be used to optimize operation of the vehicles in different circumstances that the vehicle may encounter, thereby improving operation and safety.

SUMMARY

This section generally summarizes the disclosure and is not a comprehensive explanation of its full scope or all its features.

In one embodiment, a road type determination system includes a processor and a memory in communication with the processor. The memory has a road type determination module. The road type determination module has instructions that, when executed by the processor, cause the processor to determine, using sensor data having information about at least one of a vehicle and a road upon which the vehicle is traveling, that the vehicle previously traveled on a ramp leading to a limited access highway. The road type determination module also has instructions that cause the processor to determine, using the sensor data, that the road is a limited access highway when the vehicle is traveling at or below a first predetermined speed for a first predetermined amount of time sufficiently immediately after determining that the vehicle was traveling on a ramp, and the vehicle is behind one or more preceding slow-moving vehicles.

In another embodiment, a method includes the step of determining, using a processor including sensor data having information about at least one of a vehicle and a road upon which the vehicle is traveling, that the vehicle previously traveled on a ramp leading to a limited access highway. The method also includes the step of determining, using the processor including the sensor data, that the road is a limited access highway when the vehicle is traveling at or below a first predetermined speed for a first predetermined amount of time sufficiently immediately after determining that the vehicle was traveling on a ramp, and the vehicle is behind one or more preceding slow-moving vehicles.

In yet another embodiment, a non-transitory computer-readable medium includes instructions that, when executed by a processor, cause the processor to determine, using sensor data having information about at least one of a vehicle and a road upon which the vehicle is traveling, that the vehicle previously traveled on a ramp leading to a limited access highway. The instructions also cause the processor to determine, using the sensor data, that the road is a limited access highway when the vehicle is traveling at or below a first predetermined speed for a first predetermined amount of time sufficiently immediately after determining that the vehicle was traveling on a ramp, and the vehicle is behind one or more preceding slow-moving vehicles.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method for determining a type of a road upon which a vehicle is traveling. The vehicle can include a road type determination system configured to determine whether the road upon which the vehicle is traveling is a limited access highway or a local road. In one example, the system and method can determine that the vehicle is traveling on a limited access highway when the vehicle is traveling at or below a predetermined speed for a predetermined amount of time sufficiently immediately after determining that the vehicle was traveling on a ramp, and when the vehicle is behind one or more preceding slow-moving vehicles. This determination may then be utilized to activate/deactivate or allow the activation/deactivation of a hands-free driving mode of the vehicle.

Figure 1:
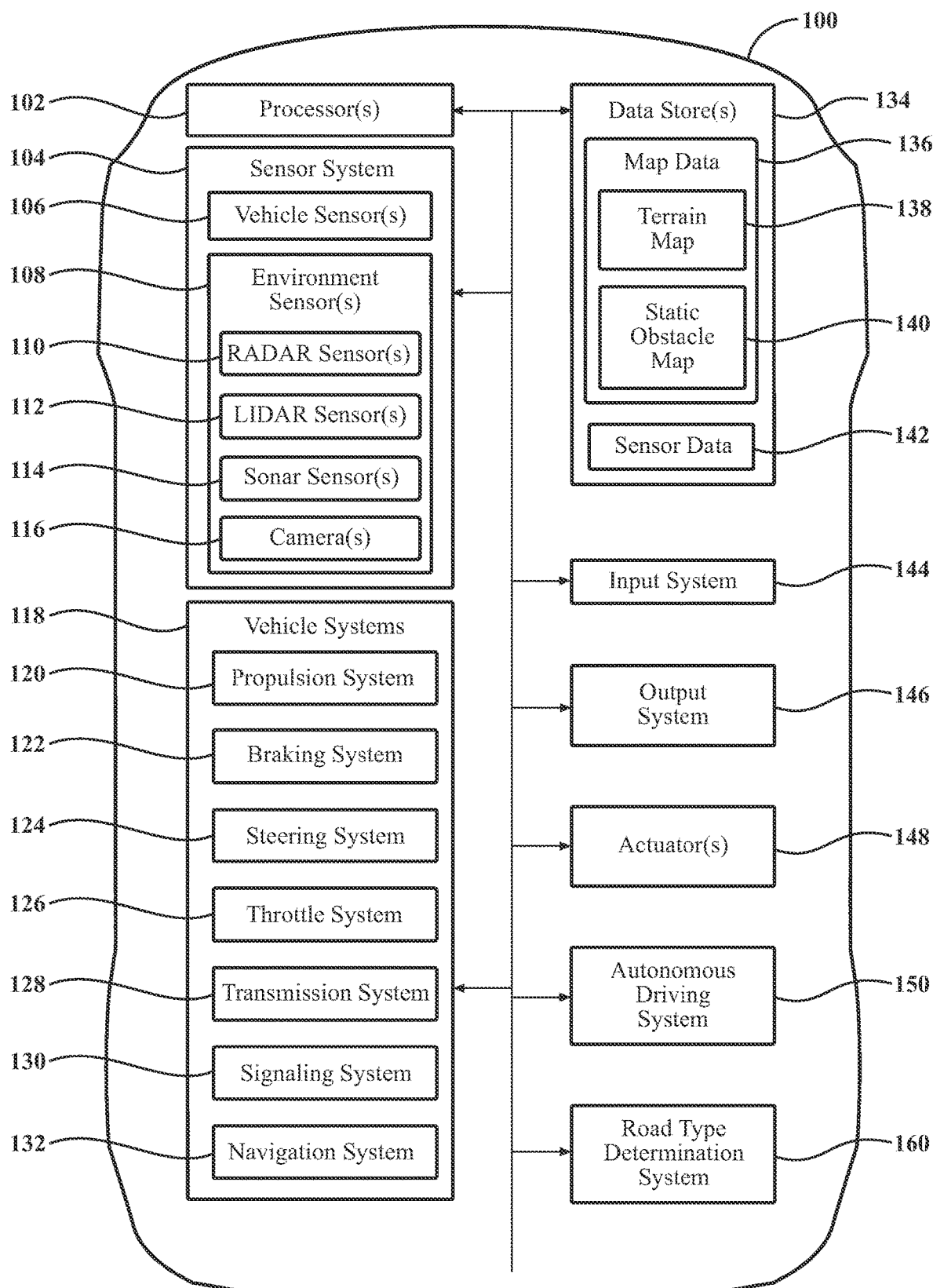
FIG. 1 illustrates one embodiment of a vehicle having a road type determination system.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles.

In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 150.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a road type determination system 160. The road type determination system 160 may be incorporated within the autonomous driving system 150 or may be separate as shown. The road type determination system 160 may be configured to determine a type of the road upon which the vehicle 100 is traveling. For example, the road type determination system 160 can determine if the road is a limited access highway or a local road. As will be explained later in this description, information regarding the road type can be utilized for a number of different purposes, such as activating/deactivating or allowing the activation/deactivation of a hands-free driving mode of the vehicle 100.

A hands-free driving mode of the vehicle 100 can involve situations wherein the vehicle 100 can pilot itself from one location to another with little to no operator input. In one example, when in a hands-free mode, the vehicle 100 can control the lateral and/or longitudinal movement of the vehicle 100, by having the autonomous driving system 150 control the steering, braking, and/or the throttle/accelerator of the vehicle 100. When the vehicle 100 is not operating in a hands-free mode, the operator of the vehicle 100 may be required to control the lateral and/or longitudinal movement of the vehicle 100. In those cases, the operator of the vehicle 100 may need to provide inputs to the steering, braking, and throttle of the vehicle 100.

Figure 2:
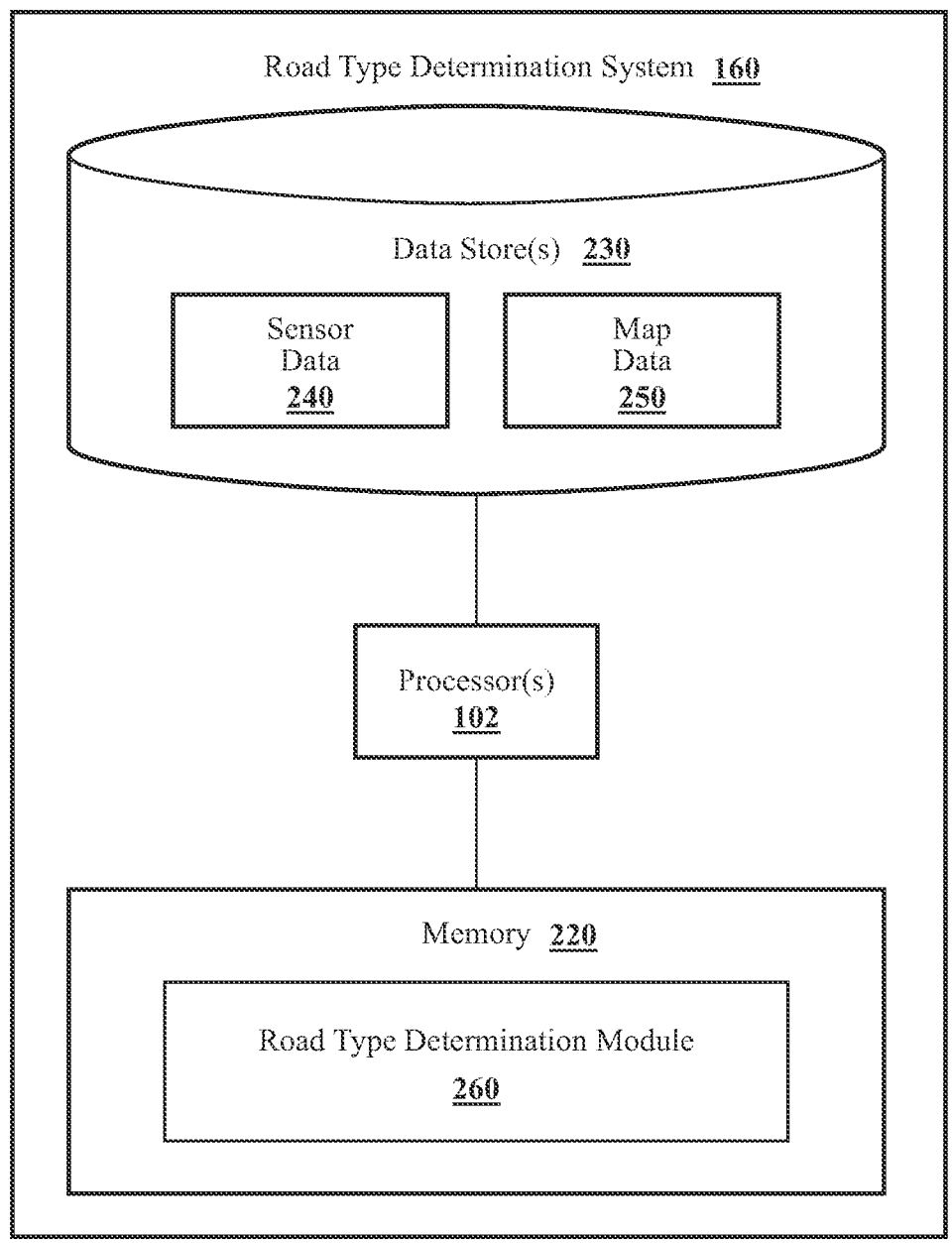
FIG. 2 illustrates an example of a road type determination system that is associated with the vehicle of FIG. 1.

With reference to FIG. 2, one embodiment of the road type determination system 160 is further illustrated. As shown, the road type determination system 160 includes one or more processor(s) 102. Accordingly, the processor(s) 102 may be a part of the road type determination system 160 or the road type determination system 160 may access the processor(s) 102 through a data bus or another communication path. In one or more embodiments, the processor(s) 102 may be an application-specific integrated circuit that is configured to implement functions associated with a road type determination module 260. In general, the processor(s) 102 are electronic processor(s) such as a microprocessor that is capable of performing various functions as described herein. Further still, in another example, the road type determining system 160 may utilize different processor(s), separate and apart from the processor(s) 102 of the vehicle 100.

In one embodiment, the road type determination system 160 includes a memory 220 that stores the road type determination module 260. The memory 220 is a random-access memory (RAM), read-only memory (ROM), a hard disk drive, a flash memory, or other suitable memory for storing the road type determination module 260. The road type determination module 260 is, for example, computer-readable instructions that, when executed by the processor(s) 102, cause the processor(s) 102 to perform the various functions disclosed herein.

Furthermore, in one embodiment, the road type determination system 160 includes one or more data store(s) 230. The data store(s) 230 are, in one embodiment, electronic data structure(s) such as a database that is stored in the memory 220 or another memory and that is configured with routines that can be executed by the processor(s) 102 for analyzing stored data, providing stored data, organizing stored data, and so on. Thus, in one embodiment, the data store(s) 230 store data used by the road type determination module 260 in executing various functions. In one embodiment, the data store(s) 230 includes sensor data 240, map data 250, and other information used by the road type determination module 260. The sensor data 240 may include some or all of the sensor data 142 shown in FIG. 1 and/or generated by the sensor system 104. The map data 250 may include some or all of the map data 136 shown in FIG. 1 and/or may be a separate map. In one example, the map data 250 is an electronic map that includes roads having road information. This road information can include indicators regarding the type of road that the road is, such as a local road, limited access highway, on-ramp to a limited access highway, off-ramp from a limited access highway, etc.

The road type determination module 260 generally includes instructions that function to control the processor(s) 102 to determine a type of road upon which the vehicle 100 is traveling. The road type can be a limited access highway, a ramp, or a local road. A limited access highway can be defined as a highway for high-speed traffic with few, if any, intersections, a divider between lanes for traffic moving in opposite directions, and ramp entry and exit (e.g., a freeway, an expressway, etc.). A ramp can be defined as an entrance ramp leading to a limited access highway (e.g., a cloverleaf highway, a feeder road, etc.). A local road can be defined as a road that is primarily used to gain access to the property bordering it (e.g., a street, a frontage road, a service road, etc.).

Generally, a limited access highway may also be a highway designed for travel by engine/motor powered vehicles, such as automobiles, trucks, and motorcycles. The limited access highway may have prohibitions for operating nonengine/motor powered vehicles, such as bicycles, human-powered scooters, skateboards, etc. Additionally, limited access highways may also prohibit pedestrians from using the limited access highway in nonemergency situations. As explained above, the determination of the type of road upon which the vehicle 100 is traveling may be utilized to activate/deactivate and/or allow the activation/deactivation of a hands-free mode of the vehicle 100.

Limited access highways, because they are heavily traveled, may have detailed map information or other information, such as high-definition map information that allows the autonomous driving system 150 to more confidently pilot the vehicle 100 in these areas. Additionally, because limited access highways are typically limited to motorized vehicles and do not have complex road configurations, such as the presence of intersections with multiple turn lanes, roundabouts, complex traffic patterns, or other variations typically found on local roads, limited access highways are generally more suitable for allowing the vehicle 100 to operate in a hands-free mode.

To determine a road type, the road type determination module 260 includes instructions that, when executed by the processor(s) 102, cause the processor(s) 102 to collect sensor data 240 using a sensor system 104 of the vehicle 100 (FIG. 1). Using the sensor data 240, the road type determination module 260 causes the processor(s) 102 to detect one or more highway events. A highway event may be an event indicating that the road 300 is a limited access highway.

Figure 3B:
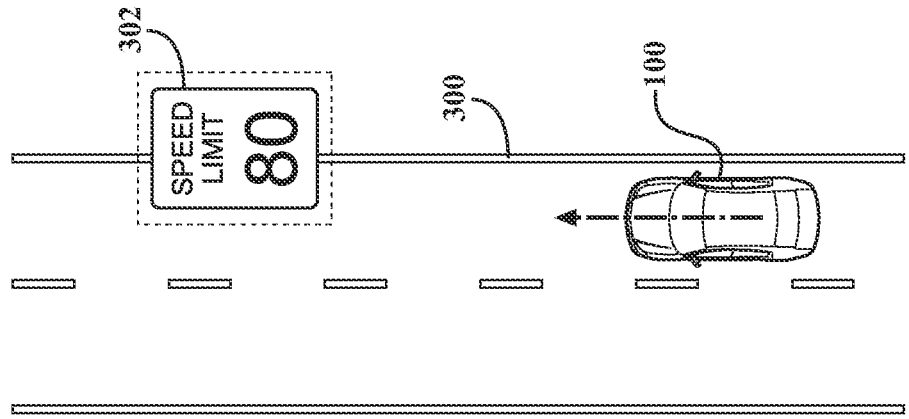
FIGS. 3A-3C illustrate various examples of highway events that may be detected by the road type determination system.
Figure 3A:
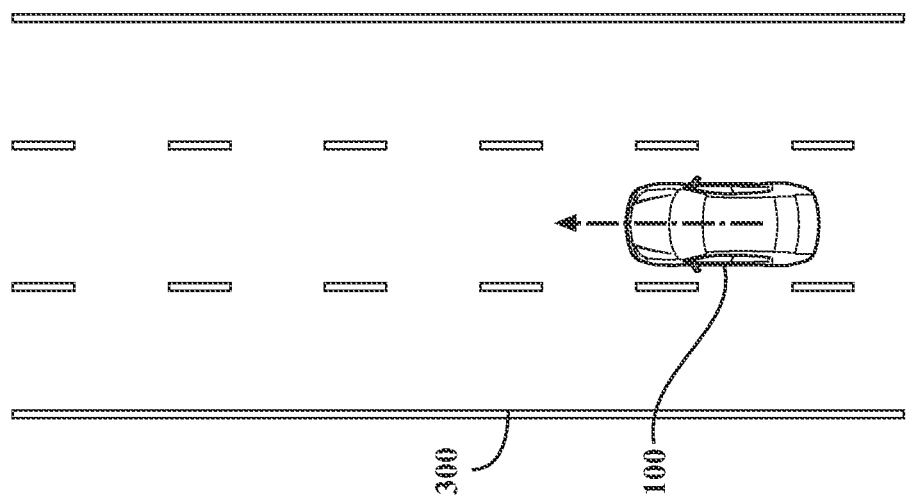
Figure 3C:
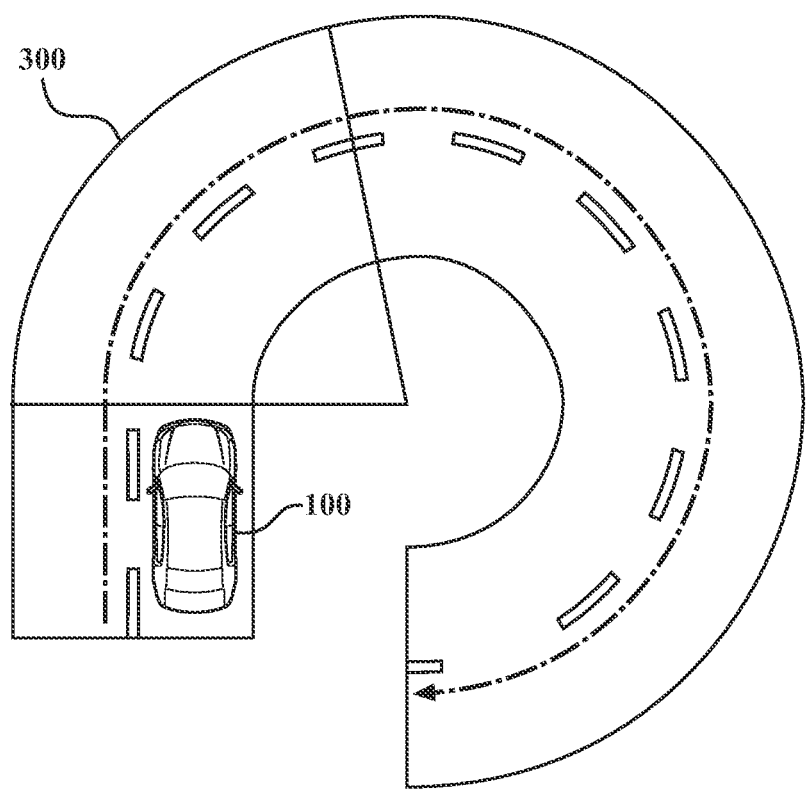

FIGS. 3A, 3B, and 3C illustrate various examples of highway events. If the road type determination system 160 determines that the sensor data 240 indicates a highway event, the road type determination system 160 can determine that the road is a limited access highway. This information may be utilized to allow the vehicle 100 and/or the operator of the vehicle 100 to activate or allow the activation of a hands-free driving mode.

Referring to FIG. 3A, the road type determination module 260 includes instructions that, when executed by the processor(s) 102, cause the processor(s) 102 to detect that the vehicle 100 is traveling on a road 300 at or greater than a predetermined speed for a predetermined amount of time using information collected from one or more vehicle sensor(s) 106, such as wheel speed sensors that can provide information regarding the speed of the vehicle 100. However, other methodologies may be utilized to determine the speed of the vehicle 100, such as vehicle position information from the navigation system 132. For example, the road type determination module can detect that the vehicle 100 is traveling at 55 miles per hour (mph) for about 120 seconds, at 65 mph for about 50 seconds, at 85 mph for about 20 seconds, or at any other predetermined speed for any other predetermined amount of time that may indicate the vehicle 100 is traveling on a limited access highway. Generally, if the vehicle 100 is traveling on a road 300 at or greater than the predetermined speed for the predetermined amount of time, the road may be determined to be a limited access highway.

Referring to FIG. 3B, the road type determination module 260 includes instructions that, when executed by the processor(s) 102, cause the processor(s) 102 detect a speed limit sign 302 indicating a speed limit of the road 300 greater than a threshold speed limit. In one example, one or more camera(s) 116 of the sensor system 104 can capture images of the environment surrounding the vehicle 100, including road signs that indicate the speed limit of the vehicle. The processor(s) 102 of the road type determination system 160 may be able to extract text from the captured images of the road sign to determine the posted speed limit of the road sign. For example, the road type determination module 260 can detect a speed limit sign 302 indicating a 60-mph speed limit, 70-mph speed limit, an 80-mph speed limit, or any other speed limit indicating that the road 300 is a limited access highway.

Referring to FIG. 3C, the road type determination module 260 includes instructions that, when executed by the processor(s) 102, cause the processor(s) 102 to detect a curvature of the road 300 less than a threshold curvature. In one example, using information collected from one or more vehicle sensor(s) 106, such as one or more accelerometers or inertial measurement units, the processor(s) 102 of the road type determination system 160 can determine the curvature of the road 300. However, other methodologies may be utilized to determine the curvature of the road 300, such as vehicle position information from the navigation system 132. For example, the road type determination system 160 can detect a curvature of the road 300 that is less than a 40° angle. Similarly, the road type determination system 160 can detect a steering wheel angle of the vehicle 100 that is less than a threshold steering wheel angle and/or a yaw rate of the vehicle 100 indicating that the vehicle 100 is making a turn less than a threshold angle. Generally, if the curvature of the road 300 is less than a threshold curvature, the road may be determined to be a limited access highway. If vehicle 100 is determined to be on a road with curvature less than road 300 for an extended distance, the system will detect that this road is a cloverleaf-style entrance or exit ramp. In this situation, the system will adjust stored limited access highway evidence such that after merging onto the limited access highway road, it will take less time to converge to a limited access highway decision.

If the sensor data 240 does not indicate that the road 300 is a limited access highway, the road type determination module 260 includes instructions that, when executed by the processor(s) 102, cause the processor(s) 102 to detect one or more non-highway events. A non-highway event is an event indicating that the vehicle 100 is traveling on a local road 400 (e.g., the vehicle 100 is not traveling on a limited access highway or a ramp). FIGS. 4A-4F illustrate various examples of non-highway events. If the road type determination system 160 determines that the sensor data 142 indicates a non-highway event, the road type determination system 160 can determine that the road is a local road.

Figure 4B:
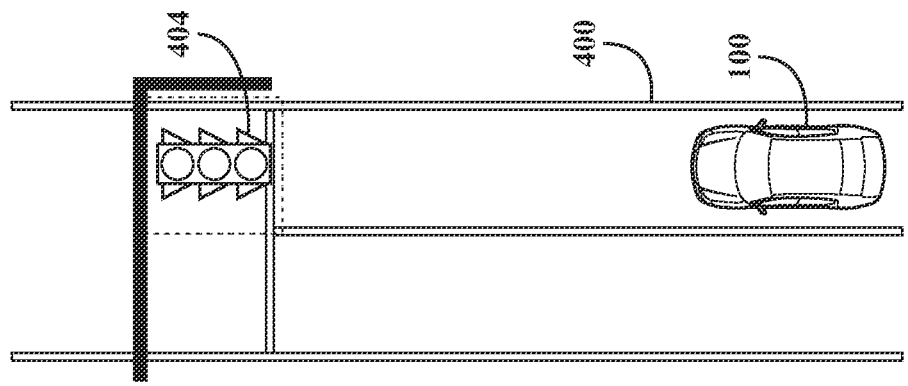
FIGS. 4A-4F illustrate various examples of non-highway events that may be detected by the road type determination system.
Figure 4A:
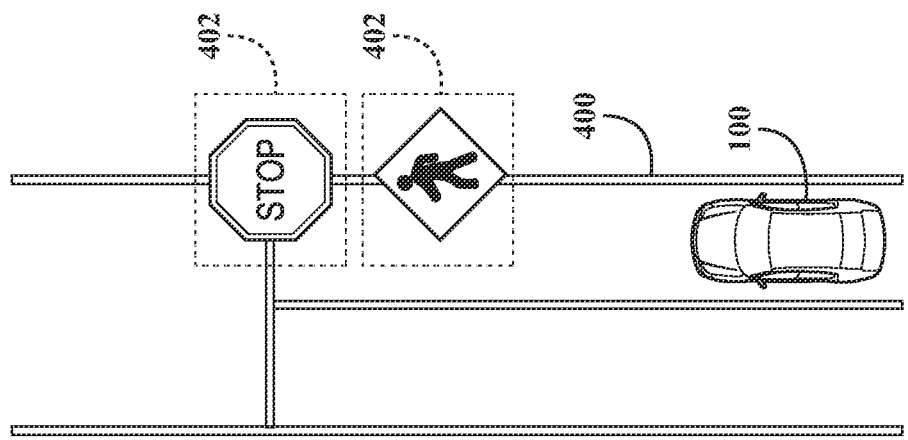

Referring to FIG. 4A, the road type determination system 160 can detect a sign 402 indicating that the vehicle 100 is traveling on a local road 400. In one example, one or more camera(s) 116 of the sensor system 104 can capture images of the environment surrounding the vehicle 100, including signs 402, but also other objects, such as stop lines and cross walks. The road type determination module 260 includes instructions that, when executed by the processor(s) 102, cause the processor(s) 102 to extract text or images from the captured images of the signs 402 to determine their meaning. As shown, the sign 402 is a stop sign; however, the sign 402 can be any other sign such as a pedestrian crossing sign, a yield sign, a school zone sign, etc.

In some instances, the road type determination module 260 includes instructions that, when executed by the processor(s) 102, cause the processor(s) 102 to detect a speed limit sign indicating a speed limit of the road 400 that is below a threshold speed limit. For example, the road type determination system 160 can detect a 40-mph speed limit sign, a 30-mph speed limit sign, a 20-mph speed limit sign, etc. In some instances, the road type determination system 160 can detect a sign on the road 400 itself, for example, a stop line or a cross walk. In some instances, the road type determination system 160 can detect the presence of a pedestrian, a bicyclist, or any other person in a crosswalk or on the side of the road 400. Generally, the presence of certain road signs commonly found on local roads, such as stop signs, yield signs, school zones signs, etc., speed limit signs below a certain speed, stop lines, and/or cross walks indicate that the road type of the road is a local road and not a limited access highway.

Referring to FIG. 4B, the road type determination module 260 includes instructions that, when executed by the processor(s) 102, cause the processor(s) 102 to detect a traffic light 404 that is used to direct traffic on the road 400. Like before, one or more camera(s) 116 of the sensor system 104 can capture images of the environment surrounding the vehicle 100, including the traffic light 404. The processor(s) 102 of the road type determining system 160 can execute algorithms that allow for the detection and classification of objects, such as traffic lights.

Figure 4C:
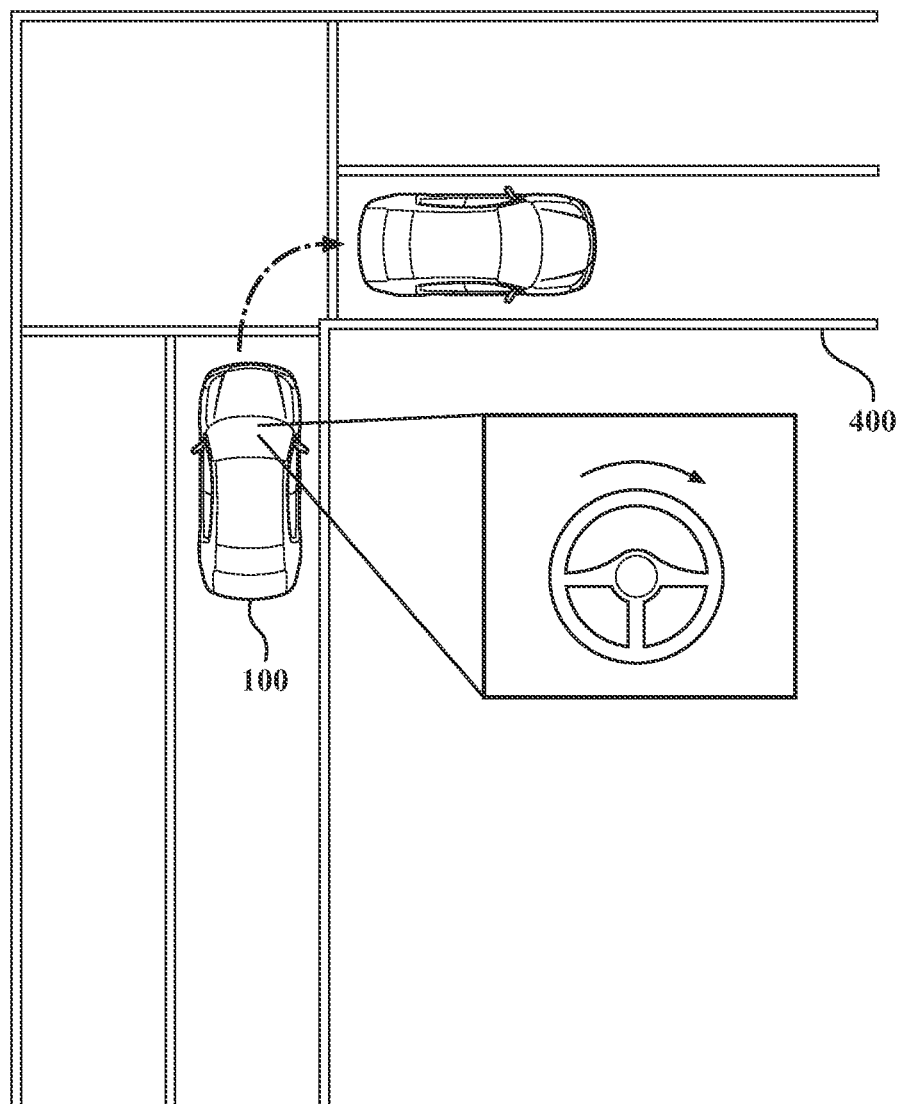

Referring to FIG. 4C, the road type determination module 260 includes instructions that, when executed by the processor(s) 102, cause the processor(s) 102 to detect a steering wheel angle of the vehicle 100 that is larger than a predetermined steering wheel angle. In one example, using information collected from one or more vehicle sensor(s) 106, such as a steering angle sensor or yaw rate sensor, the processor(s) 102 of the road type determining system 160 can determine the steering wheel angle of the vehicle 100. The road type determination system 160 can also detect that the vehicle 100 is making or has just made a substantially 90° turn. The road type determination system 160 can also detect a curvature of the road 400 greater than a predetermined angle. For example, the road type determination system 160 can detect a curvature of the road 400 that is greater than a 40° angle. The road type determination system 160 can also detect a yaw rate of the vehicle 100 to determine if the vehicle is making a turn.

Figure 4E:
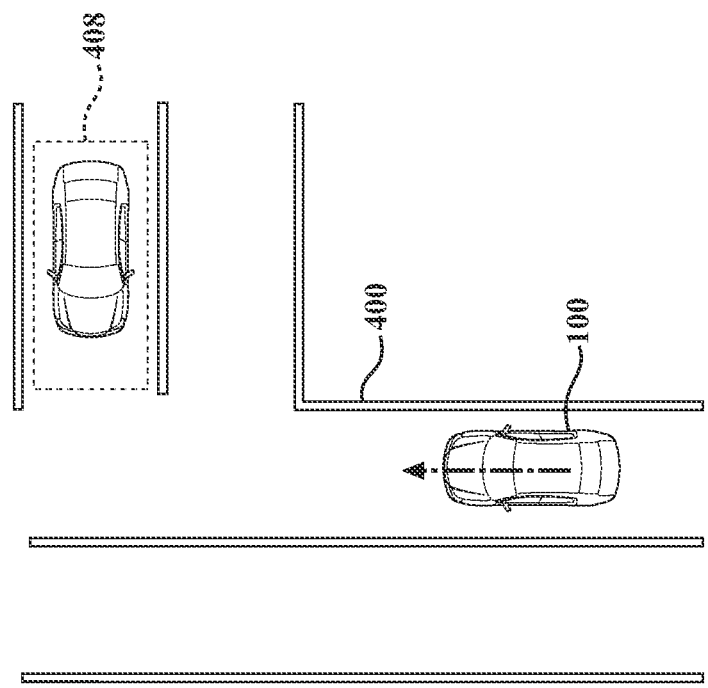
Figure 4D:
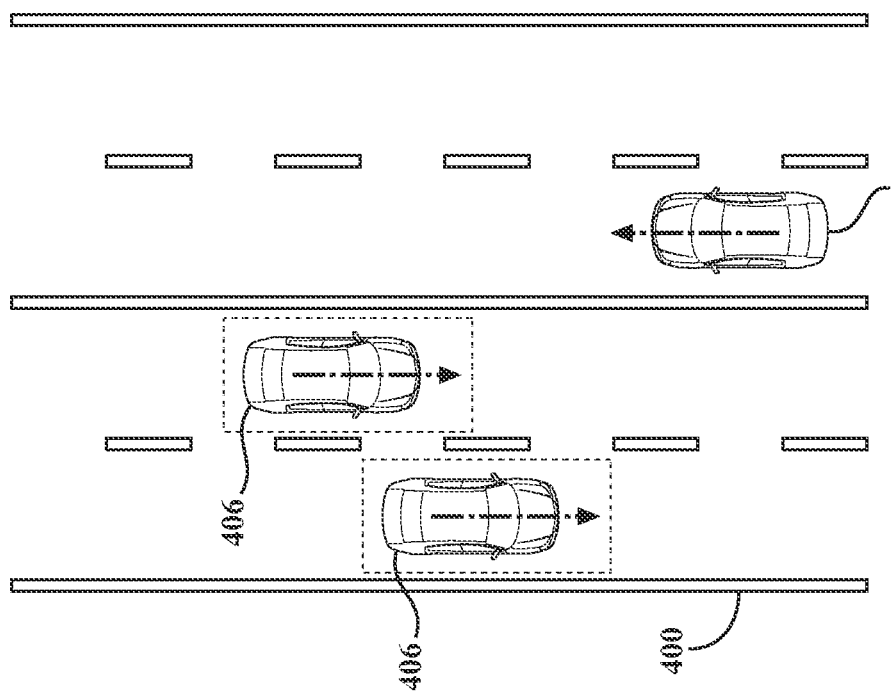

Referring to FIG. 4D, the road type determination module 260 includes instructions that, when executed by the processor(s) 102, cause the processor(s) 102 to detect one or more oncoming vehicles 406 located in a lane opposite the vehicle 100 for longer than a threshold distance. One or more camera(s) 116 of the sensor system 104 can capture images of the environment surrounding the vehicle 100, including one or more oncoming vehicles 406. The processor(s) 102 of the road type determining system 160 can execute algorithms that allow for the detection and classification of objects, such as the one or more oncoming vehicles 406.

Referring to FIG. 4E, the road type determination module 260 includes instructions that, when executed by the processor(s) 102, cause the processor(s) 102 to detect one or more lateral crossing vehicles 408 on the road 400. One or more camera(s) 116 of the sensor system 104 can capture images of the environment surrounding the vehicle 100, including one or more oncoming vehicles 406. The processor(s) 102 of the road type determining system 160 can execute algorithms that allow for the detection and classification of objects, such as or more lateral crossing vehicles 408 on the road 400.

Figure 4F:
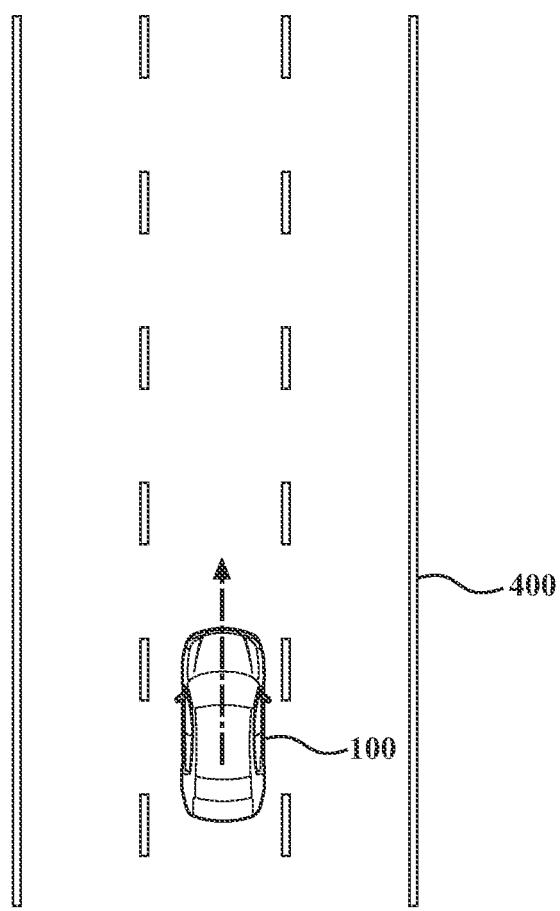

Referring to FIG. 4F, the road type determination module 260 includes instructions that, when executed by the processor(s) 102, cause the processor(s) 102 to detect that the vehicle 100 is traveling at or below a predetermined speed for a predetermined amount of time using information collected from one or more vehicle sensor(s) 106, such as wheel speed sensors that can provide information regarding the speed of the vehicle 100. However, other methodologies may be utilized to determine the speed of the vehicle 100, such as vehicle position information from the navigation system 132. For example, the road type determination module 260 includes instructions that, when executed by the processor(s) 102, cause the processor(s) 102 to detect that the vehicle 100 is traveling at or below 40 mph for two or more seconds, at or below 30 mph for three or more seconds, etc.

In some instances, it is possible that a highway event may not be directly indicated by the sensor data 240. In particular, this may happen in situations when the vehicle 100 experiences traffic on the limited access highway, causing the vehicle 100 to have a velocity more typically accustomed to a local road. When this occurs, the road type determination system 160 can collect additional sensor data from the sensor system 104 to generate a more accurate road type determination and prevent false positives and/or false negatives from occurring.

For example, referring to FIGS. 5A and 5B, the road type determination module 260 includes instructions that, when executed by the processor(s) 102, cause the processor(s) 102 to determine that the vehicle 100 is traveling on a limited access highway if the road type determination system 160 detects that the vehicle 100 is traveling on a road 500, which is in the form of a limited access highway, at or below a predetermined speed for a predetermined amount of time behind a slow-moving vehicle 502 and that the vehicle 100 previously traveled on a ramp. This may correspond to an event in which the vehicle 100 enters a limited access highway using a ramp and merges behind a slow-moving vehicle traveling on the limited access highway.

Figure 5B:
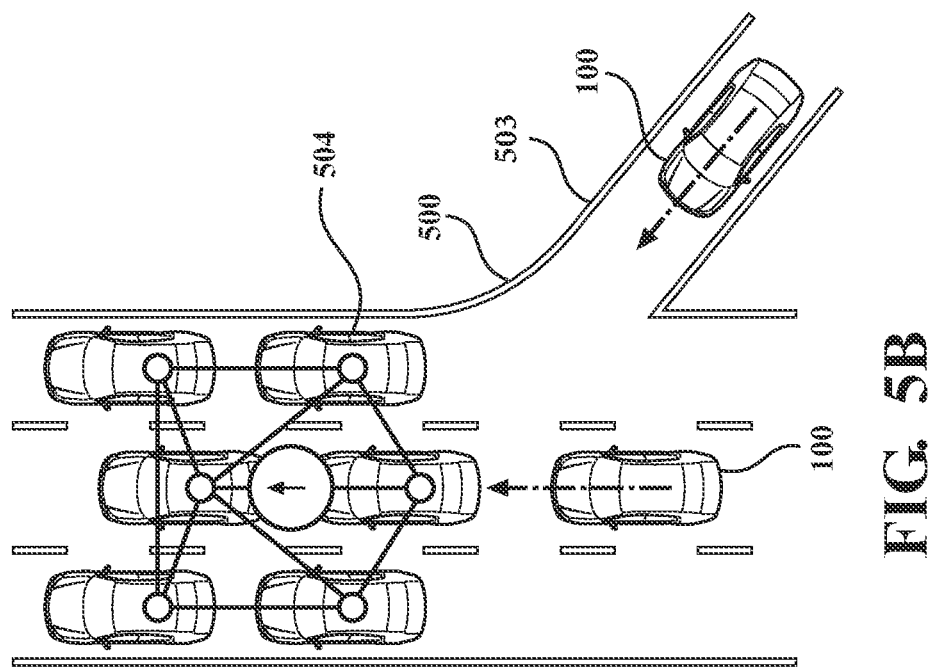
FIGS. 5A and 5B illustrate various examples of other driving events that may be detected by the road type determination system.
Figure 5A:
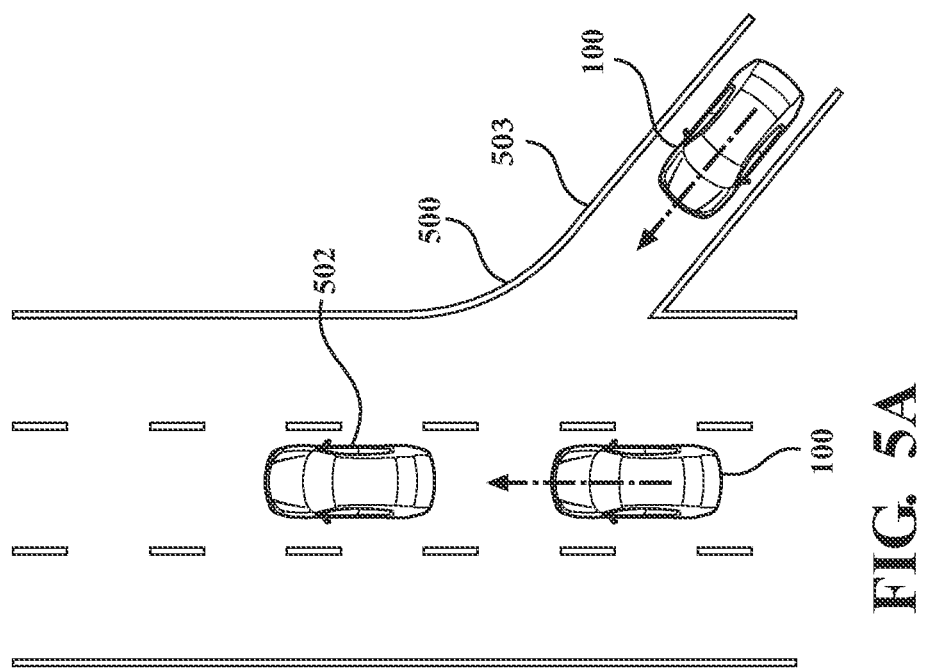

Referring to FIG. 5B, the road type determination module 260 includes instructions that, when executed by the processor(s) 102, cause the processor(s) 102 to detect that the vehicle 100 is traveling on the road 500 at or below a predetermined speed for a predetermined amount of time behind a cluster of slow-moving vehicles 504 and that the vehicle 100 previously traveled on a ramp 503. This may correspond to an event in which the vehicle 100 enters a limited access highway using a ramp and merges into existing traffic on the limited access highway.

In these instances, the road type determination module 260 includes instructions that, when executed by the processor(s) 102, cause the processor(s) 102 to determine that the road 500 is a limited access highway if it detects one or more slow-moving vehicles 502 and that the vehicle 100 is traveling at or below a predetermined speed for a predetermined amount of time sufficiently immediately after the vehicle previously traveled on a ramp, such as the ramp 503. The predetermined amount of speed for the predetermined amount of time may be similar to those described in the paragraphs above when describing FIG. 4F.

As used herein, "sufficiently immediately after" can be based on an amount of time that has passed since the vehicle 100 traveled on the ramp 503 and/or a distance that the vehicle 100 has traveled since the vehicle traveled on the ramp 503. In one example, "sufficiently immediately after" can mean approximately two minutes or less after a determination that the vehicle 100 traveled on the ramp 503. In another example, "sufficiently immediately after" can mean approximately 1000 meters traveled by the vehicle 100 after a determination that the vehicle 100 traveled on the ramp 503. However, "sufficiently immediately after" can mean any suitable amount of time or distance after a determination that the vehicle 100 traveled on the ramp 503.

As to determining if the vehicle 100 traveled on the ramp 503, the road type determination module 260 includes instructions that, when executed by the processor(s) 102, cause the processor(s) 102 to determine that the vehicle 100 is traveling on a ramp 503 leading to a limited access highway using the detected curvature of the road, the speed of the vehicle 100, the acceleration of the vehicle 100, the yaw rate of the vehicle 100, a GPS trajectory of the vehicle 100, the detection of lane markers on the road, and/or any other detected criteria to determine if the vehicle 100 was previously traveling on the ramp 503. Information used to make these determinations may be collected by the sensor system 104. For example, the sensor system 104, in particular the vehicle sensor(s) 106 can include sensors, such as accelerometers, wheel speed sensors, steering angle sensors, inertial measurement units, GPS sensors, and the like to provide information to make these determinations.

If the road type determination system 160 determines that the road is a local road, the road type determination system 160 may be configured to suspend collection of the sensor data 240 for a predetermined amount of time after determining that the road is a local road. In another example, instead of suspending the collection of sensor data 240, the road type determination system 160 may simply pause collection of sensor data 240 for a sufficient amount of time before making another attempt to determine the road type. For example, the road type determination system 160 may suspend collection of sensor data 240 and/or pause for 1 second, 2 seconds, 10 seconds, 1 minute, etc. This may reduce state flipping and/or incorrect road type determinations.

In some arrangements, the road type determination module 260 includes instructions that, when executed by the processor(s) 102, cause the processor(s) 102 to determine a road type without communicating with additional infrastructure and/or without the use of any map and/or GPS data. In other arrangements, the road type determination module 260 includes instructions that, when executed by the processor(s) 102, cause the processor(s) 102 to use such additional infrastructure to verify or otherwise confirm that a road type determination is correct. For example, if the road type determination system 160 determines that the road upon which the vehicle 100 is traveling is a limited access highway, and map data 136 (FIG. 1) indicates that the vehicle 100 is traveling on a limited access highway, the road type determination system 160 can use this information to verify the road type.

As mentioned previously, in some arrangements, the road type determination may be used as an input to other modules, features, functions, and or systems of the vehicle. For example, the road type determination may be used as an input to a hands-free driving mode, which may be a feature of the autonomous driving system 150. For example, if the road type determination system 160 determines that the vehicle 100 is traveling on a limited access highway, the autonomous driving system 150 may be configured to activate and/or allow the activation of a hands-free driving mode. Upon the determination that the road is a local road, the autonomous driving system 150 may be configured to deactivate or prevent activation of a hands-free driving mode. In other examples, the road type determination can be used as an input to any other vehicle system that may require a road type determination, for example, lane trace assist systems, lane change assist systems, advanced driver assistance systems (ADAS), etc.

Figure 6:
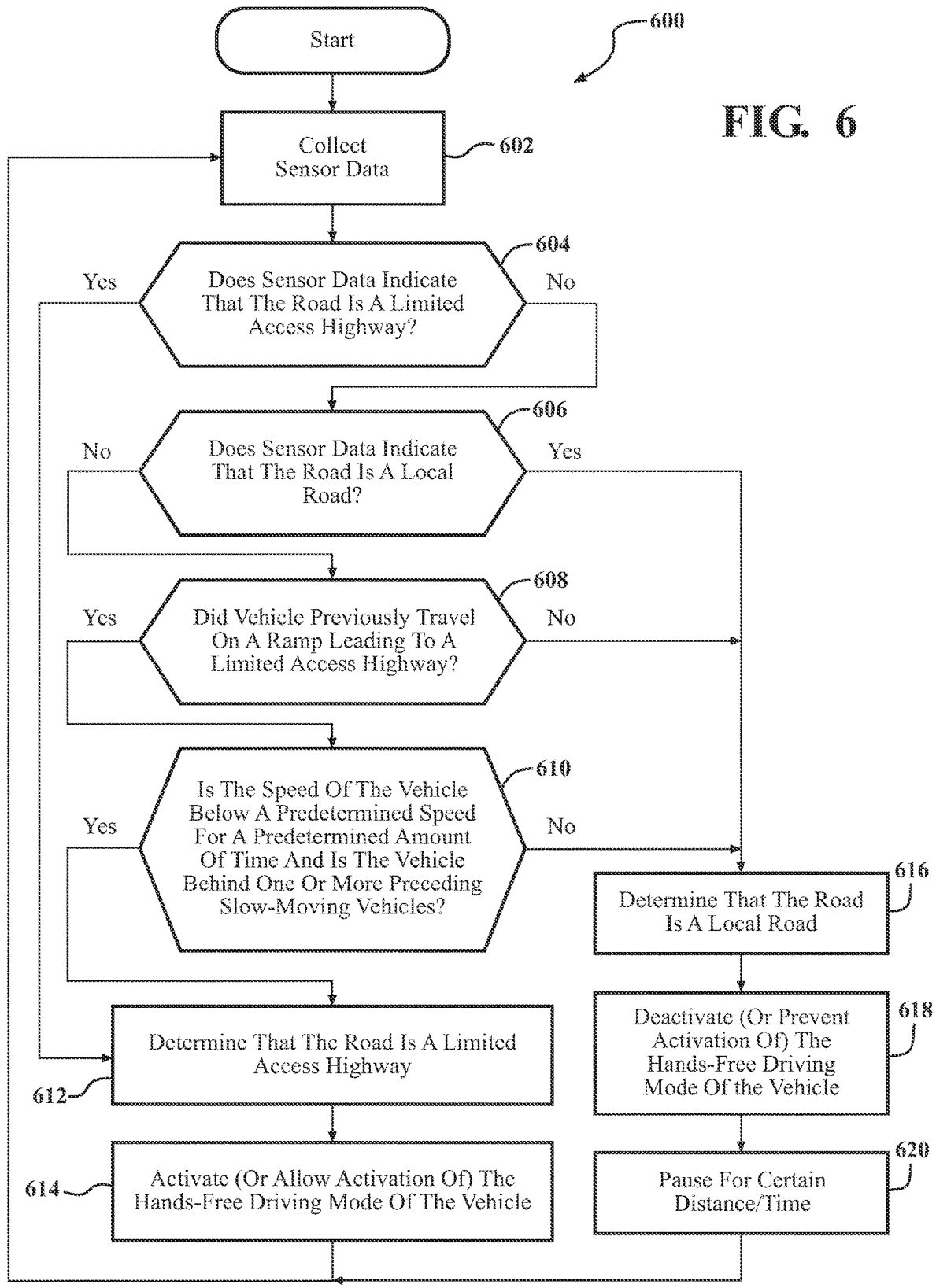
FIG. 6 illustrates a method of determining a type of road upon which a vehicle is traveling.

Referring to FIG. 6, a method 600 for controlling a vehicle having an autonomous mode and a semi-autonomous mode is shown. The method 600 will be described from the viewpoint of the vehicle 100 of FIG. 1 and the road type determination system 160 of FIG. 2. However, it should be understood that this is just one example of implementing the method 600. While method 600 is discussed in combination with the road type determination system 160, it should be appreciated that the method 600 is not limited to being implemented within the road type determination system 160 but is instead one example of a system that may implement the method 600.

The method 600 begins at step 602. Here, the road type determination module 260 includes instructions that, when executed by the processor(s) 102, cause the processor(s) 102 to collect sensor data 240 from the various sensors forming the sensor system 104 of the vehicle 100. The sensor data 240 can include information about the sensors that the vehicle 100 is equipped with, including the capabilities and other information about such sensors. For example, the sensor data 240 can include information about the vehicle sensor(s) 106 and the environment sensor(s) 108 (including the radar sensor(s) 110, LIDAR sensor(s) 112, sonar sensor(s) 114, and camera(s) 116). This information can include the speed of the vehicle 100, the acceleration of the vehicle 100, the yaw rate of the vehicle 100, and/or information about the external environment of the vehicle 100 (including weather conditions, road conditions, information about objects in the external environment, and/or information about one or more other vehicles in the external environment of the vehicle 100), just to name a few examples.

In step 604, the road type determination module 260 causes the processor(s) 102 to determine if the sensor data 240 indicates that the road upon which the vehicle 100 is traveling is a limited access highway. For example, the road type determination system 160 can detect a highway event indicating that the road is a limited access highway. For example, using the sensor data 240, the road type determination system 160 can detect that the vehicle 100 is traveling on a road at or greater than a predetermined speed for a predetermined amount of time. In another example, using the sensor data 240, the road type determination system 160 can detect a speed limit sign indicating a speed limit of the road greater than a threshold speed limit. In another example, using the sensor data 240, the road type determination system 160 can detect a curvature of the road 300 less than a threshold curvature.

If the sensor data 240 indicates that the road is a limited access highway, the road type determination system 160 will determine that the road is a limited access highway in step 612. The method 600 can then proceed to activate or otherwise allow activation of a hands-free driving mode of the vehicle 100 in step 614.

If, in step 604, the sensor data does not indicate that the road is a limited access highway (e.g., the road type determination system 160 detects a non-highway event), the method 600 will proceed to step 606 in which the road type determination module 260 causes the processor(s) 102 to determine if the sensor data indicates that the road is a local road (e.g. the road type determination system 160 detects a non-highway event). For example, using the sensor data 240, the road type determination system 160 can detect a sign 402 indicating that the vehicle 100 is traveling on a local road or a speed limit sign indicating a speed limit of the road 400 that is below a threshold speed limit. In another example, using the sensor data 240, the road type determination system 160 can a traffic light 404 that is used to direct traffic on the road. In another example, using the sensor data 240, the road type determination system can detect a steering wheel angle of the vehicle 100 that is larger than a predetermined steering wheel angle. In yet another example, using the sensor data 240, the road type determination system 160 can detect one or more oncoming vehicles 406 located in a lane opposite the vehicle 100 for longer than a threshold distance or detect one or more lateral crossing vehicles 408 on the road. In yet another example, using the sensor data 240, the road type determination system 160 can detect that the vehicle 100 is traveling at or below a predetermined speed for a predetermined amount of time.

If the sensor data 240 indicates that the road is a local road, the road type determination module 260 causes the processor(s) 102 to determine that the road is a local road in step 616. If the road type determination system 160 determines that the road is a local road, the road type determination module 260 causes the processor(s) 102 to deactivate or otherwise prevent activation of a hands-free driving mode of the vehicle 100 in step 618. In step 620, the road type determination module 260 causes the processor(s) 102 to suspend collection of sensor data 240 and/or pause the execution of the method 600 for a predetermined amount of time after determining that the road is a local road. This predetermined amount of time may be 1 second, 2 seconds, 10 seconds, 1 minute, etc., or any other suitable predetermined amount of time.

If, in step 606, the sensor data does not indicate that the road is a local road, the method 600 proceeds to step 608. In step 608, the road type determination module 260 causes the processor(s) 102 to determine if the vehicle 100 previously traveled on a ramp leading to a limited access highway. For example, the road type determination system 160 can determine that the vehicle 100 previously traveled on a ramp leading to a limited access highway using the detected curvature of the road, the speed of the vehicle 100, the acceleration of the vehicle 100, the yaw rate of the vehicle 100, a GPS trajectory of the vehicle 100, the detection of lane markers on the road, and/or any other detected criteria to determine if the vehicle 100 was previously traveling on the ramp. Information used to make these determinations may be collected by the sensor system 104. For example, the sensor system 104, in particular the vehicle sensor(s) 106 can include sensors, such as accelerometers, wheel speed sensors, steering angle sensors, inertial measurement units, GPS sensors, and the like to provide information to make these determinations.

If the vehicle 100 did not previously travel on a ramp leading to a limited access highway, the method 600 proceeds to step 616 in which the road type determination module 260 causes the processor(s) 102 to determine that the road is a local road. If the road type determination system 160 determines that the vehicle 100 did previously travel on a ramp leading to a limited access highway, the method 600 proceeds to step 610. In step 610, the road type determination module 260 causes the processor(s) 102 to determine if the speed of the vehicle 100 is at or below a predetermined speed for a predetermined amount of time and if the vehicle 100 is traveling behind one or more preceding slow-moving vehicles. For example, the road type determination system 160 can detect that the vehicle 100 is traveling on a road, which is in the form of a limited access highway, at or below a predetermined speed for a predetermined amount of time behind a slow-moving vehicle and that the vehicle 100 previously traveled on a ramp. In another example, the road type determination system 160 can detect that the vehicle 100 is traveling on the road at or below a predetermined speed for a predetermined amount of time behind a cluster of slow-moving vehicles and that the vehicle 100 previously traveled on a ramp. If these conditions are met, the method proceeds to step 612 in which the road type determination module 260 causes the processor(s) 102 to determine that the road is a limited access highway. The method 600 can then proceed to step 614, in which the vehicle 100 may activate or otherwise allow activation of a hands-free driving mode of the vehicle 100.

FIG. 1 will now be discussed in full detail as an example environment within which the system and methods disclosed herein may operate. In one or more embodiments, the vehicle 100 is a vehicle that can operate in an autonomous, semi-autonomous, and/or non-autonomous mode. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the autonomous driving system 150 to ensure the vehicle 100 remains within defined state constraints.

The vehicle 100 can also include a hands-free driving mode. The hands-free driving mode can be a component or a sub-feature of the autonomous mode of the vehicle 100 or can be a component of any other system of the vehicle 100. A hands-free driving mode of the vehicle 100 can enable the vehicle 100 to pilot itself from one location to another with little to no operator input. In one example, when in a hands-free mode, the vehicle 100 can control the lateral and/or longitudinal movement of the vehicle 100, by having the autonomous driving system 150 control the steering, braking, and/or the throttle/accelerator of the vehicle 100. When the vehicle 100 is not operating in a hands-free mode, the operator of the vehicle 100 may be required to control the lateral and/or longitudinal movement of the vehicle 100. In those cases, the operator of the vehicle 100 may need to provide inputs to the steering, braking, and throttle of the vehicle 100.

The vehicle 100 can include one or more processor(s) 102. In one or more arrangements, the processor(s) 102 can be a main processor of the vehicle 100. For instance, the processor(s) 102 can be an electronic control unit (ECU). The vehicle 100 can also include one or more data store(s) 134 for storing one or more types of data. The data store(s) 134 can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 134 can be a component of the processor(s) 102, or the data store(s) 134 can be operatively connected to the processor(s) 102 for use thereby. The term "operatively connected," as used throughout this description, can include direct or indirect connections, including connections without direct physical contact.

In one or more arrangements, the one or more data store(s) 134 can include map data 136. The map data 136 can include maps of one or more geographic areas. In some instances, the map data 136 can include information or data on roads, traffic control devices, road markings, structures, features, and/or landmarks in the one or more geographic areas. The map data 136 can be in any suitable form. In some instances, the map data 136 can include aerial views of an area. In some instances, the map data 136 can include ground views of an area, including 360-degree ground views. The map data 136 can include measurements, dimensions, distances, and/or information for one or more items included in the map data 136 and/or relative to other items included in the map data 136. The map data 136 can include a digital map with information about road geometry. The map data 136 can be high quality and/or highly detailed.

In one or more arrangements, the map data 136 can include one or more terrain map(s) 138. The terrain map(s) 138 can include information about the ground, terrain, roads, surfaces, and/or other features of one or more geographic areas. The terrain map(s) 138 can include elevation data in the one or more geographic areas. The map data 136 can be high quality and/or highly detailed. The terrain map(s) 138 can define one or more ground surfaces, which can include paved roads, unpaved roads, land, and other things that define a ground surface.

In one or more arrangements, the map data 136 can include one or more static obstacle map(s) 140. The static obstacle map(s) 140 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 140 can have location data, size data, dimension data, material data, and/or other data associated with it. The static obstacle map(s) 140 can include measurements, dimensions, distances, and/or information for one or more static obstacles. The static obstacle map(s) 140 can be high quality and/or highly detailed. The static obstacle map(s) 140 can be updated to reflect changes within a mapped area.

The data store(s) 134 can include sensor data 142, as mentioned above. In this context, "sensor data" means any information about the sensors that the vehicle 100 is equipped with, including the capabilities and other information about such sensors. As will be explained below, the vehicle 100 can include the sensor system 104. The sensor data 142 can relate to one or more sensors of the sensor system 104.

In some instances, at least a portion of the map data 136 and/or the sensor data 142 can be located in one or more data store(s) 134 located onboard the vehicle 100. Alternatively, or in addition, at least a portion of the map data 136 and/or the sensor data 142 can be located in one or more data store(s) 134 that are located remotely from the vehicle 100.

As noted above, the vehicle 100 can include the sensor system 104. The sensor system 104 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 104 includes a plurality of sensors, the sensors can work independently from each other. Alternatively, two or more of the sensors can work in combination with each other. In such a case, the two or more sensors can form a sensor network. The sensor system 104 and/or the one or more sensors can be operatively connected to the processor(s) 102, the data store(s) 134, and/or another element of the vehicle 100 (including any of the elements shown in FIG. 1). The sensor system 104 can acquire data of at least a portion of the external environment of the vehicle 100 (e.g., nearby vehicles).

The sensor system 104 can include any suitable type of sensor. Various examples of different types of sensors will be described herein. However, it will be understood that the embodiments are not limited to the particular sensors described. The sensor system 104 can include one or more vehicle sensor(s) 106. The vehicle sensor(s) 106 can detect, determine, and/or sense information about the vehicle 100 itself. In one or more arrangements, the vehicle sensor(s) 106 can be configured to detect, and/or sense position and orientation changes of the vehicle 100, such as, for example, based on inertial acceleration. In one or more arrangements, the vehicle sensor(s) 106 can include one or more accelerometers, one or more gyroscopes, an inertial measurement unit (IMU), a dead-reckoning system, a global navigation satellite system (GNSS), a global positioning system (GPS), a navigation system 132, and/or other suitable sensors. The vehicle sensor(s) 106 can be configured to detect, and/or sense one or more characteristics of the vehicle 100. In one or more arrangements, the vehicle sensor(s) 106 can include a speedometer to determine a current speed of the vehicle 100.

Alternatively, or in addition, the sensor system 104 can include one or more environment sensor(s) 108 configured to acquire, and/or sense driving environment data. "Driving environment data" includes data or information about the external environment in which an autonomous vehicle is located or one or more portions thereof. For example, the one or more environment sensor(s) 108 can be configured to detect, quantify and/or sense obstacles in at least a portion of the external environment of the vehicle 100 and/or information/data about such obstacles. Such obstacles may be stationary objects and/or dynamic objects. The one or more environment sensor(s) 108 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 104 will be described herein. The example sensors may be part of the one or more environment sensor(s) 108 and/or the one or more vehicle sensor(s) 106. However, it will be understood that the embodiments are not limited to the particular sensors described.

As an example, in one or more arrangements, the sensor system 104 can include one or more radar sensor(s) 110, one or more LIDAR sensor(s) 112, one or more sonar sensor(s) 114, and/or one or more camera(s) 116. In one or more arrangements, the one or more camera(s) 116 can be high dynamic range (HDR) cameras or infrared (IR) cameras.

The vehicle 100 can include an input system 144. An "input system" includes any device, component, system, element, or arrangement or groups thereof that enable information/data to be entered into a machine. The input system 144 can receive an input from a vehicle passenger (e.g., a driver or a passenger). The vehicle 100 can include an output system 146. An "output system" includes any device, component, or arrangement or groups thereof that enable information/data to be presented to a vehicle passenger (e.g., a person, a vehicle passenger, etc.).

The vehicle 100 can include one or more vehicle systems 118. Various examples of the one or more vehicle systems 118 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 120, a braking system 122, a steering system 124, throttle system 126, a transmission system 128, a signaling system 130, and/or a navigation system 132. Each of these systems can include one or more devices, components, and/or a combination thereof, now known or later developed.

The navigation system 132 can include one or more devices, applications, and/or combinations thereof, now known or later developed, configured to determine the geographic location of the vehicle 100 and/or to determine a travel route for the vehicle 100. The navigation system 132 can include one or more mapping applications to determine a travel route for the vehicle 100. The navigation system 132 can include a global positioning system, a local positioning system, or a geolocation system.

The processor(s) 102, the road type determination system 160, and/or the autonomous driving system 150 can be operatively connected to communicate with the vehicle systems 118 and/or individual components thereof. For example, returning to FIG. 1, the processor(s) 102 and/or the autonomous driving system 150 can be in communication to send and/or receive information from the vehicle systems 118 to control the movement, speed, maneuvering, heading, direction, etc. of the vehicle 100. The processor(s) 102, the road type determination system 160, and/or the autonomous driving system 150 may control some or all of these vehicle systems 118 and, thus, may be partially or fully autonomous.

The processor(s) 102, the road type determination system 160, and/or the autonomous driving system 150 can be operatively connected to communicate with the vehicle systems 118 and/or individual components thereof. For example, returning to FIG. 1, the processor(s) 102, the road type determination system 160, and/or the autonomous driving system 150 can be in communication to send and/or receive information from the vehicle systems 118 to control the movement, speed, maneuvering, heading, direction, etc. of the vehicle 100. The processor(s) 102, the road type determination system 160, and/or the autonomous driving system 150 may control some or all of these vehicle systems 118.

The processor(s) 102, the road type determination system 160, and/or the autonomous driving system 150 may be operable to control the navigation and/or maneuvering of the vehicle 100 by controlling one or more of the vehicle systems 118 and/or components thereof. For instance, when operating in an autonomous mode, the processor(s) 102, the road type determination system 160, and/or the autonomous driving system 150 can control the direction and/or speed of the vehicle 100. The processor(s) 102, the road type determination system 160, and/or the autonomous driving system 150 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 148. The actuators 148 can be any element or combination of elements operable to modify, adjust and/or alter one or more of the vehicle systems 118 or components thereof to responsive to receiving signals or other inputs from the processor(s) 102 and/or the autonomous driving system 150. Any suitable actuator can be used. For instance, the one or more actuators 148 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor, implement one or more of the various processes described herein. One or more of the modules can be a component of the processor(s) 102, or one or more of the modules can be executed on and/or distributed among other processing systems to which the processor(s) 102 is operatively connected. The modules can include instructions (e.g., program logic) executable by one or more processor(s) 102. Alternatively, or in addition, one or more data store(s) 134 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving systems. The autonomous driving system 150 can be configured to receive data from the sensor system 104 and/or any other type of system capable of capturing information relating to the vehicle 100 and/or the external environment of the vehicle 100. In one or more arrangements, the autonomous driving system 150 can use such data to generate one or more driving scene models. The autonomous driving system 150 can determine position and velocity of the vehicle 100. The autonomous driving system 150 can determine the location of obstacles, obstacles, or other environmental features including traffic signs, trees, shrubs, neighboring vehicles, pedestrians, etc.

The autonomous driving system 150 can be configured to receive, and/or determine location information for obstacles within the external environment of the vehicle 100 for use by the processor(s) 102, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 150 either independently or in combination with the road type determination system 160 can be configured to determine travel path(s), current autonomous driving maneuvers for the vehicle 100, future autonomous driving maneuvers and/or modifications to current autonomous driving maneuvers based on data acquired by the sensor system 104, driving scene models, and/or data from any other suitable source such as determinations from the sensor data 142 as implemented by the autonomous driving system 150. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 150 can be configured to implement determined driving maneuvers. The autonomous driving system 150 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 150 can be configured to execute various vehicle functions and/or to transmit data to, receive data from, interact with, and/or control the vehicle 100 or one or more systems thereof (e.g., one or more of vehicle systems 118).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a processor; and
a memory in communication with the processor, the memory having a road type determination module having instructions that, when executed by the processor, cause the processor to:
   determine, using sensor data having information about at least one of a vehicle and a road upon which the vehicle is traveling, that the vehicle previously traveled on a ramp leading to a limited access highway;
   determine, using the sensor data, that the road is a limited access highway when:
      the vehicle is traveling at or below a first predetermined speed for a first predetermined amount of time sufficiently immediately after determining that the vehicle was traveling on the ramp, and
      the vehicle is behind one or more preceding vehicles after merging; and
   activate a hands-free driving mode of the vehicle in response to determining that the road is a limited access highway.

2. The system of claim 1, wherein the processor is further configured to determine, using the sensor data, that the road is a limited access highway upon the detection of at least one of:
   a speed limit sign indicating a speed limit of the road above a threshold speed limit,
   a curvature of the road lower than a threshold curvature,
   a steering wheel angle lower than a threshold steering wheel angle, and
   a yaw rate indicating that the vehicle is making a turn lower than a threshold angle.

3. The system of claim 1, wherein the processor is further configured to determine, using the sensor data, that the road is a local road upon the detection of at least one of:
   a speed of the vehicle at or below a predetermined speed for a predetermined amount of time,
   a curvature in the road greater than a threshold curvature,
   a steering wheel angle greater than a threshold steering wheel angle,
   a yaw rate indicating that the vehicle is making a turn greater than a threshold angle,
   one or more oncoming vehicles located in a lane opposite the vehicle for longer than a threshold distance,
   one or more vehicles performing a lateral crossing on the road,
   at least one of a stop sign, a stop line, a crosswalk, a pedestrian crossing sign, a yield sign, a school zone sign, and a speed limit sign indicating a speed limit of the road below a threshold speed limit,
   at least one of a pedestrian and a bicyclist using the road, and
   a traffic light for directing traffic on the road.

4. The system of claim 3, wherein the processor is further configured to suspend collection of the sensor data for a predetermined amount of time after determining that the road is a local road.

5. The system of claim 1, wherein the processor is further configured to verify that the road is a limited access highway by determining when a position of the vehicle in an electronic map indicates that the vehicle is traveling upon a limited access highway.

6. A method comprising the steps of:
determining, using a processor including sensor data having information about at least one of a vehicle and a road upon which the vehicle is traveling, that the vehicle previously traveled on a ramp leading to a limited access highway;
determining, using the processor including the sensor data, that the road is a limited access highway when:
   the vehicle is traveling at or below a first predetermined speed for a first predetermined amount of time sufficiently immediately after determining that the vehicle was traveling on the ramp, and
   the vehicle is behind one or more preceding vehicles after merging; and
activating a hands-free driving mode of the vehicle in response to determining that the road is a limited access highway.

7. The method of claim 6, further comprising the step of:
determining, using the sensor data, that the road is a limited access highway upon the detection of at least one of:
   a speed limit sign indicating a speed limit of the road above a threshold speed limit,
   a curvature of the road lower than a threshold curvature,
   a steering wheel angle lower than a threshold steering wheel angle, and
   a yaw rate indicating that the vehicle is making a turn lower than a threshold angle.

8. The method of claim 6, wherein the processor is further configured to determine, using the sensor data, that the road is a limited access highway when the vehicle is traveling at or greater than a second predetermined speed for a second predetermined amount of time.

9. The method of claim 8, wherein the first predetermined speed is lower than the second predetermined speed.

10. The method of claim 6, further comprising the step of:
determining, using the sensor data, that the road is a local road upon the detection of at least one of:
   a speed of the vehicle at or below a predetermined speed for a predetermined amount of time,
   a curvature in the road greater than a threshold curvature,
   a steering wheel angle greater than a threshold steering wheel angle, a yaw rate indicating that the vehicle is making a turn is greater than a threshold angle, one or more oncoming vehicles located in a lane opposite the vehicle for longer than a threshold distance, one or more vehicles performing a lateral crossing on the road are detected, at least one of a stop sign, a stop line, a crosswalk, a pedestrian crossing sign, a yield sign, a school zone sign, and a speed limit sign indicating a speed limit of the road below a threshold speed limit, at least one of a pedestrian and a bicyclist using the road, and a traffic light for directing traffic on the road.

11. The method of claim 10, further comprising the step of:

suspending collection of the sensor data for a predetermined amount of time after determining that the road is a local road.

12. The method of claim 6, further comprising the step of:

verifying that the road is a limited access highway by determining when a position of the vehicle in an electronic map indicates that the vehicle is traveling upon a limited access highway.

13. A non-transitory computer-readable medium including instructions that, when executed by a processor, cause the processor to:

determine, using sensor data having information about at least one of a vehicle and a road upon which the vehicle is traveling, that the vehicle previously traveled on a ramp leading to a limited access highway;

determine, using the sensor data, that the road is a limited access highway when:

the vehicle is traveling at or below a first predetermined speed for a first predetermined amount of time sufficiently immediately after determining that the vehicle was traveling on the ramp, and the vehicle is behind one or more preceding vehicles after merging; and activate a hands-free driving mode of the vehicle in response to determining that the road is a limited access highway.

14. The non-transitory computer-readable medium of claim 13, wherein the processor is further configured to determine, using the sensor data, that the road is a limited access highway upon the detection of at least one of:

a speed limit sign indicating a speed limit of the road above a threshold speed limit, a curvature of the road lower than a threshold curvature, a steering wheel angle lower than a threshold steering wheel angle, and a yaw rate indicating that the vehicle is making a turn lower than a threshold angle.

15. The non-transitory computer-readable medium of claim 13, wherein the processor is further configured to determine, using the sensor data, that the road is a local road upon the detection of at least one of:

a curvature in the road greater than a threshold curvature, a steering wheel angle greater than a threshold steering wheel angle, a yaw rate indicating that the vehicle is making a turn is greater than a threshold angle, one or more oncoming vehicles located in a lane opposite the vehicle for longer than a threshold distance, one or more vehicles performing a lateral crossing on the road are detected, at least one of a stop sign, a stop line, a crosswalk, a pedestrian crossing sign, a yield sign, a school zone sign, and a speed limit sign indicating a speed limit of the road below a threshold speed limit, at least one of a pedestrian and a bicyclist using the road, and a traffic light for directing traffic on the road.

16. The non-transitory computer-readable medium of claim 15, wherein the processor is further configured to suspend collection of the sensor data for a predetermined amount of time after determining that the road is a local road.

17. The non-transitory computer-readable medium of claim 13, wherein the processor is further configured to verifying that the road is a limited access highway by determining when a position of the vehicle in an electronic map indicates that the vehicle is traveling upon a limited access highway.

* * * * *